United States Patent [19]
Garfinkel et al.

[11] Patent Number: 6,157,298
[45] Date of Patent: Dec. 5, 2000

[54] SAFETY HELMET WITH DIRECTIONAL AND BREAK SIGNALS HAVING AM/FM AND TWO-WAY COMMUNICATION CAPABILITY

[76] Inventors: Mitchell D. Garfinkel; Phil Bart, both of One Financial Plz., Suite 2111, Fort Lauderdale, Fla. 33304

[21] Appl. No.: 09/369,128

[22] Filed: Aug. 5, 1999

[51] Int. Cl.[7] .................................................. B60Q 1/44
[52] U.S. Cl. ............................ 340/479; 340/464; 340/463
[58] Field of Search ............................... 340/427, 479, 340/473, 463, 464, 468, 475, 465, 467, 469, 470, 471

[56] References Cited

U.S. PATENT DOCUMENTS

| | | | |
|---|---|---|---|
| 3,586,977 | 6/1971 | Lustig | 325/16 |
| 3,720,918 | 3/1973 | Perl | 340/432 |
| 3,889,190 | 6/1975 | Palmer | 325/16 |
| 4,090,185 | 5/1978 | Patty | 340/321 |
| 4,195,328 | 3/1980 | Harris, Jr. | 362/72 |
| 4,357,711 | 11/1982 | Drefko et al. | 455/89 |
| 4,559,516 | 12/1985 | Schott et al. | 340/432 |
| 4,559,586 | 12/1985 | Slarve | 362/106 |
| 4,648,131 | 3/1987 | Kawaguchi et al. | 455/606 |
| 4,769,629 | 9/1988 | Tigwell | 340/432 |
| 4,833,726 | 5/1989 | Shinoda et al. | 455/89 |
| 5,119,505 | 6/1992 | Tisseront et al. | 455/89 |
| 5,142,700 | 8/1992 | Reed | 455/344 |
| 5,329,637 | 7/1994 | Walker | 340/573 |
| 5,353,008 | 10/1994 | Eikenberry et al. | 340/479 |
| 5,590,209 | 12/1996 | Pratt et al. | 381/168 |

*Primary Examiner*—Jeffery A. Hofsass
*Assistant Examiner*—Daniel Previl
*Attorney, Agent, or Firm*—Brinkley, McNerney, Morgan, Soloman & Tatum, LLP

[57] ABSTRACT

A one or two-piece safety helmet to be used while biking, skating, rollerblading or while performing other recreational activities using non-motorized vehicles, wherein in one configuration, the helmet is comprised of an inner and outer shell secured together via VELCRO™ or snaps, wherein both shells meet appropriate helmet safety standards. The helmet features a chin-strap, directional signals, a break light, an AM/FM radio, and two-way communication capabilities. The directional signals and break light allows a user to warn others when the user is turning or slowing down. Pre-recorded warning messages in the form of a voice message or a warning signal may be stored on a chip embedded within a electronics module situated in the rear of the outer shell of the helmet. The messages or warning signals alert the user when the chin-strap is not secured or the helmet is not being properly used. Illumination means, via the use of a headlight, are provided on the front portion of the helmet's outer shell to provide illumination in the user's field of vision. A two-way communication system and AM/FM capabilities are features of the helmet which allow the user to converse with others or enjoy audio entertainment.

15 Claims, 3 Drawing Sheets

SAFETY HELMET WITH DIRECTIONAL AND BREAK SIGNALS HAVING AM/FM AND TWO-WAY COMMUNICATION CAPABILITY

BACKGROUND OF THE INVENTION

1. Field of the Invention

This invention relates to protective helmets, and more particularly to a safety helmet which can be used while biking, skiing, in-line skating, ice or roller skating, or while engaging in other recreational activities, and which includes features such as directional signals, a brake light, AM/FM radio, two-way voice communications, and pre-recorded safety messages.

2. Description of Related Art

The use of safety helmets assists in protecting the head of a human being from fractures, abrasions, and other trauma that may be sustained while performing work, sports, and other activities.

Safety helmets having communications capabilities have been utilized for some time in work and recreational environments. One such device has been invented by Kawaguchi et al., as disclosed in U.S. Pat. No. 4,648,131. This work helmet is for effecting intercommunications between workers as well as between a central control room and respective workers, especially used to inform such workers of evacuation plans in the event of an emergency.

The invention disclosed in U.S. Pat. No. 4,833,726 to Shinoda et al, teaches a helmet with two-way radio communication facilities to be used by workers who work in the construction industry.

U.S. Pat. No. 5,329,637 to Walker discloses a fireman's helmet with integral front and rear lights to be utilized in dark environments.

The invention disclosed in U.S. Pat. No. 5,353,008 to Eikenberry et al teaches a motorcycle helmet with brake light that includes a duty cycled receiver circuit for receiving a radio frequency signal from a transmitter located on the motorcycle.

U.S. Pat. No. 3,586,977 to Lustig et al. discloses voice intercommunication between a motorcycle rider and a passenger when both are wearing motorcycle helmets.

A number of background devices that teach the use of communication safety helmets are as follows: U.S. Pat. No. 4,357,711 to Drefko et al.; U.S. Pat. No. 3,889,190 to Palmer; and U.S. Pat. No. 5,590,209 issued to Pratt et al.

Those who work in hazardous areas or participate in sport events usually wear safety helmets or communication safety helmets for their own protection. However, the communication safety helmets presently utilized are limited with respect to directional and brake signals, communication means, and audio entertainment.

BRIEF SUMMARY OF THE INVENTION

The present invention provides safety helmet users the ability to verbally communicate with people in the vicinity, enjoy AM or FM radio, illuminate dark areas in the user's field of vision, and to notify others behind the user of their intention to turn or slow down via the use of directional signals and a brake light.

The communications safety helmet comprises an outer shell that includes a surrounding wall structure defining a recess therein. The outer shell with optional vents may be vacuum formed, molded, or made by a similar process. The outer shell covers a shock-absorbing inner shell arranged within the recess of the outer shell and adapted to comfortably receive the user's head. The user can attach the helmet to his or her head with the aid of chin-straps or similar means to keep the helmet secure.

The helmet comprises two-way communication means, an internal and/or external transmitting and receiving antenna, an AM/FM radio and transceiver with automatic squelch and audio override capabilities, and a means for cellular phone and beeper communications. The front of the outer shell further comprises a headlight, the side of the helmet comprises directional lights, and the rear of the outer shell comprises a second set of directional lights as well as a brake light. An electronics control module is contained within the outer shell and contains the transceiver and batteries necessary to power and operate the circuitry enabling the communication, signaling and illumination features of the present invention. The helmet may comprise a horn affixed to the outer surface of the outer shell as well a plurality of contact switches to allow the user to manually activate the directional signals.

The communication safety helmet provides a means to protect the user's head while he or she is participating in work, sporting events or recreational activities and to verbally and visually communicate with others in the vicinity.

The present invention comprises a two-piece safety helmet with communication and directional features, which can be used with a bicycle, in-line, roller or ice skates, motorcycles, or other devices. However, a one-piece helmet may be utilized including all of the features of the present invention. The shell would include all of the safety features of the inner shell described herein.

Specifically, the present invention includes a shock-absorbent inner shell adapted to fit comfortably upon a user's head, an outer shell having front and rear portions and opposing side portions defining a recess adapted to receive the inner shell and is affixed thereto via securing means, a plurality of directional signals situated on each side portion of the outer surface of the outer shell and rear directional signals in the form of directional arrows situated on the rear portion of the outer shell wherein the directional signals are activated via user activation means, a brake light situated at the rear portion of the outer shell which indicates when a helmet user is preparing to stop, and which is situated on the surface of the outer shell and is illuminated via illumination means, a removable electronics control module situated within the rear portion of the outer shell wherein the module houses a transceiver having transmission and receiving modes and including switching means designed to activate and deactivate the transmission and receiver modes, and a detachable power supply to the control module.

The helmet further comprises an antenna affixed to the outer surface of the outer shell having transmitting means to transmit a high frequency signal in the form of electromagnetic waves, and receiving means for receiving electromagnetic waves from a remote transmitter.

The safety helmet of the present invention further comprises a helmet-securing chin strap, a communications module affixed to a side portion of the outer shell which includes an earphone assembly proximate the user's ear and a microphone module proximate the user's mouth.

In an alternate embodiment, the helmet comprises selection means to select one of a plurality of communication channels, and volume control means to increase or decrease the volume of the audio signals emanating from the earphone assembly.

The brake light illumination means is comprised of an inertia-switch contained in the electronics module which actuates the brake light upon the deceleration of the user. The directional signals are activated by the user by manually touching a button thereby activating a momentary contact switch, wherein the button is situated upon the outer surface of the outer shell within the user's reach.

The outer shell which is comprised of a vacuum molded, single piece contiguous material, is removably affixed to the inner shell via a VELCRO™ strip or a snap situated upon both the inner surface of the outer shell and the outer surface of the inner shell, around the periphery of each.

In an alternate embodiment, the helmet comprises an automatic squelch circuit to eliminate unwanted ambient noise when the transceiver is in said receiver mode.

In an alternate configuration, the helmet of the present invention comprises an audio override system wherein ambient sounds above a predetermined decibel level override sound emanating from the earphone assembly.

An alternate embodiment of the present invention provides for cellular telephone communications and/or pager communications.

In an alternate embodiment the helmet includes a sound-emitting device situated within said electronics module and containing one or more pre-recorded voice messages or a pre-recorded warning signal, to alert the user if the chin strap is not fastened or is fastened incorrectly, or if said helmet is situated upon the user's head in an unsafe manner.

In an alternate embodiment, a headlight assembly is removably affixed to the front portion of the outer shell to provide illumination in the user's field of vision.

It is therefore an object of this invention to provide those who utilize the communication safety helmet a means to communicate with others in the vicinity with the aid of two-way communication means.

It is another object of this invention to provide a safety helmet which includes cellular phone and a beeper communication capabilities.

It is yet another object of this invention to provide a communication safety helmet having means for illumination in front of the helmet, means for activating directional signals at the side and rear portion of the helmet and means for actuating a brake light at the rear of the helmet to alert others of the user's intention to turn or stop.

It is yet another object of this invention to provide a detachable power source for the communication safety helmet.

It is another object of this invention to provide a pre-recorded warning message or warning signal which alerts the user if the helmet is not being used properly.

It is yet another object of this invention to provide a communication safety helmet having a horn.

In accordance with these and other objects, which will become apparent hereinafter, the instant invention will now be described with particular references to the accompanying drawings.

DETAILED DESCRIPTION OF THE INVENTION

Figure 1:
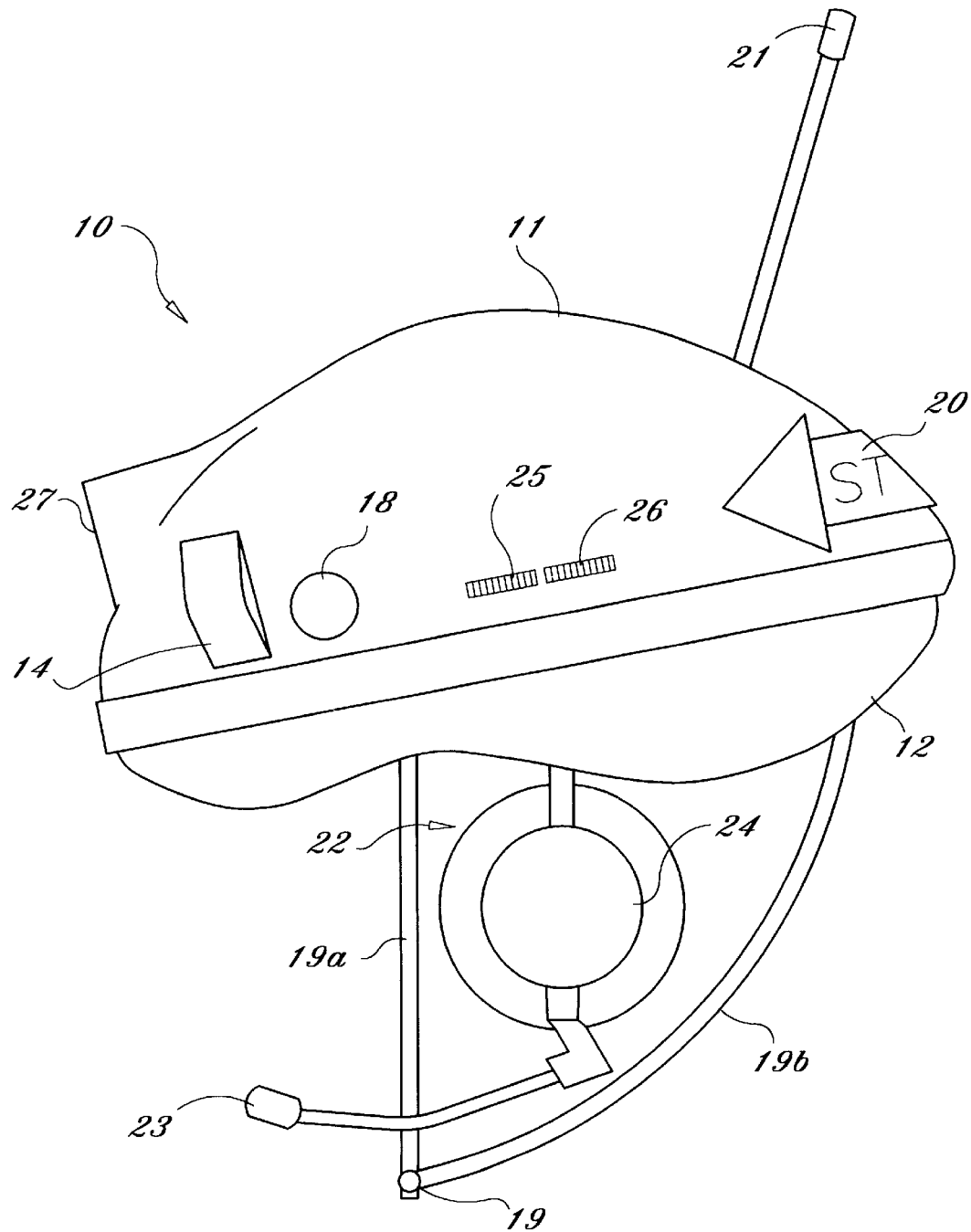
FIG. 1 is a side view of the invention showing various features on the outer shell.

Referring now to the drawings, and in particular to FIG. 1, the present invention is shown generally at numeral 10.

The present invention, a safety helmet with communication and signaling capabilities, is comprised of an outer shell 11 and an inner shell 12. The inner shell 12 is comprised of a foam core and is designed to fit comfortably upon a user's head and is made of conventional shock-absorbent bicycle helmet material. The outer shell 11 may be made of a hard electrically insulating plastic material or a similar durable material and is adapted to fit over the inner shell 12. The outer shell 11 is affixed to the inner shell 12 via affixing means such as VELCRO™ or snaps which are place about the periphery of each shell. This allows for movement between each shell without obstruction.

Figure 2:
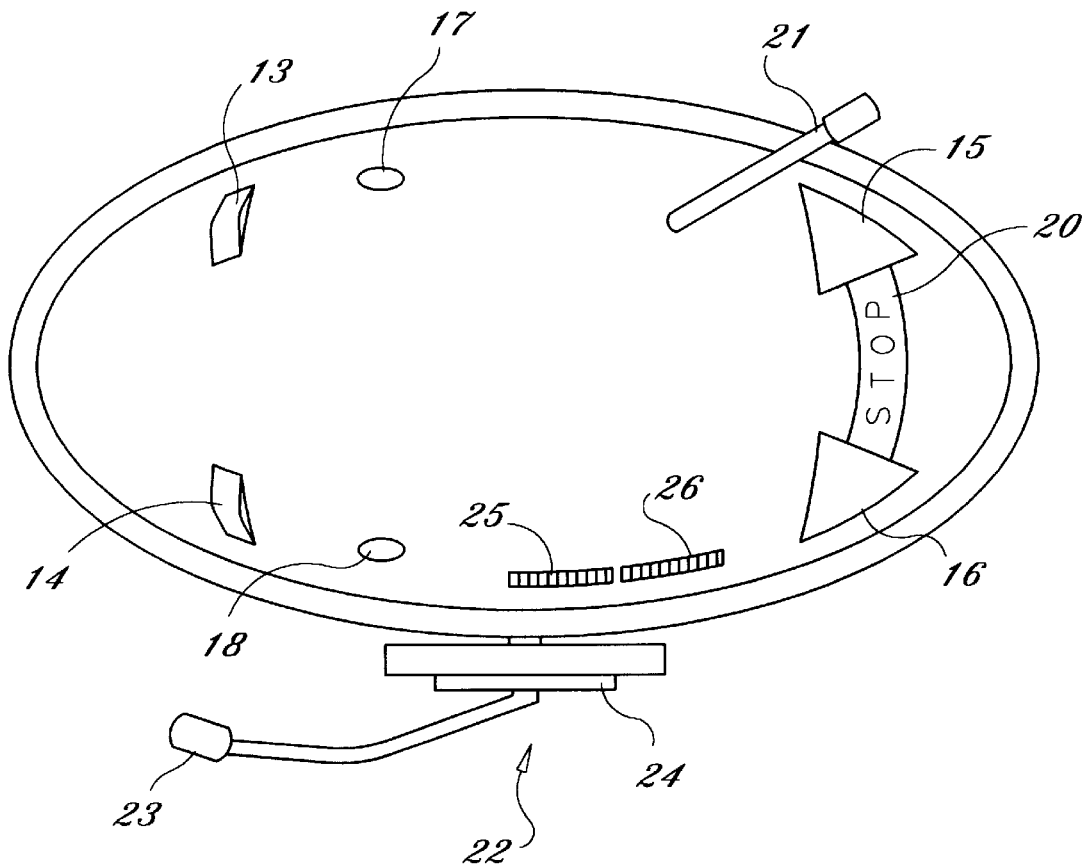
FIG. 2 is a top view of the invention showing features on the outer shell.

FIG. 2 shows a top view of the invention and clearly shows a right directional signal 13 and a left directional signal 14 toward the front portion of outer shell 11. Additional directional signals, in the form of a right directional arrow 15 and a left directional arrow 16, are situated on the rear portion of the outer shell, to warn those behind the user when the user plans on turning either right or left. The directional signals, 13 and 14, are activated, manually, via a right directional button 17 and a left directional button 18, located on each side of outer shell 11. Similarly, when the user wishes to turn right, he or she can reach up and depress the right directional button 17, which, in turn, activates a momentary contact switch which turns on the right directional signal 13. When turning left, the user depresses the left directional button 18, to activate the left directional signal 14. The flashing of the directional signals also produces a clicking sound which informs the user that the directional signal is indeed on. When the turn has been completed, the user simply presses the appropriate directional button again and the directional signal ceases to flash.

Figure 3:
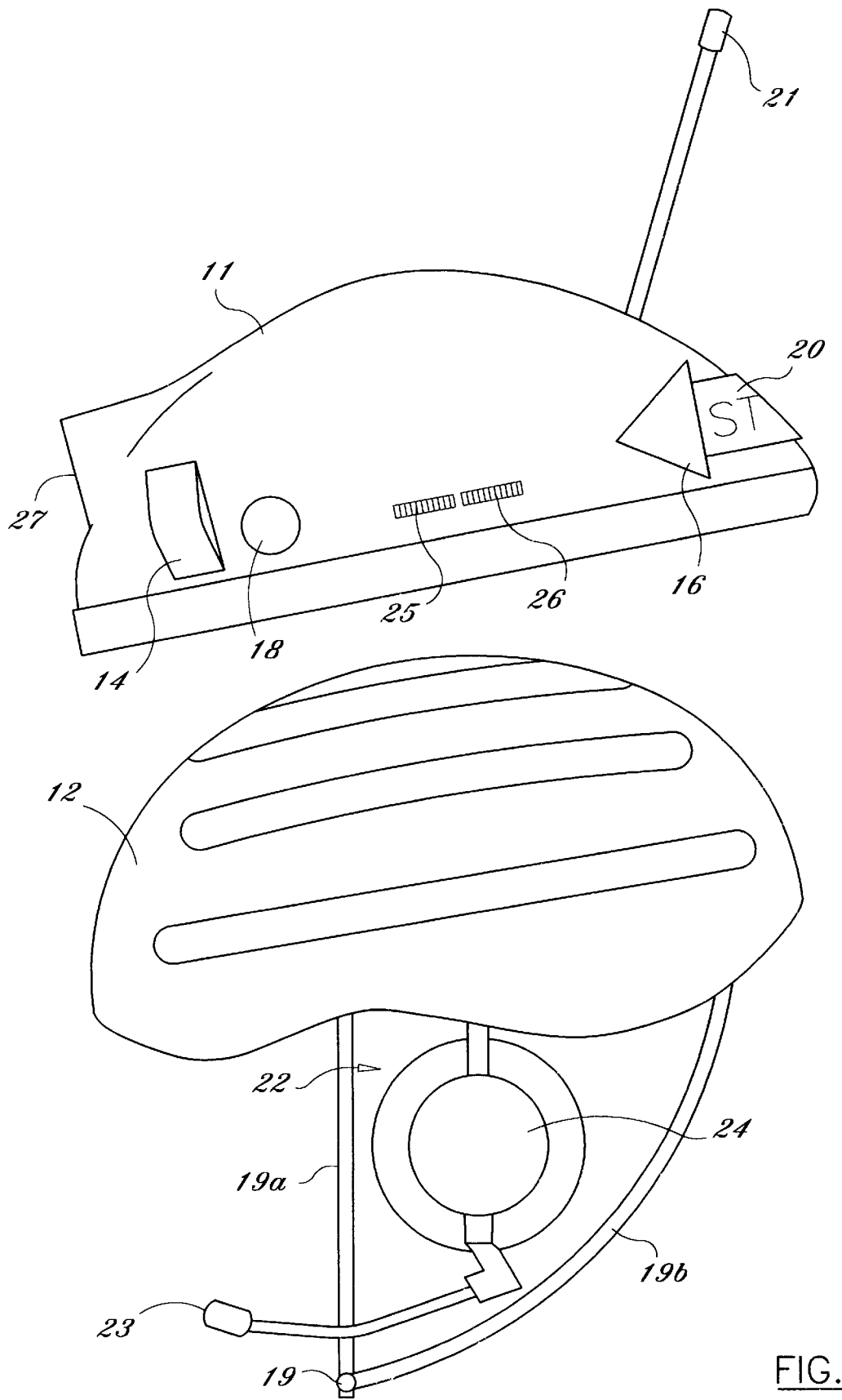
FIG. 3 is a side of view showing both the outer shell and the inner shell of the present invention.

Referring to FIG. 3, the inner shell 12 of helmet 10 includes chin straps 19 which include a side component 19a and rear component 19b both of which extend from inner shell 12 to secure the helmet 10 to the user's head. Both the inner shell 12 and the outer shell 11 define air vents (not shown) to allow air to flow freely throughout the helmet 10, thereby providing a natural cooling effect to the user when in motion.

The preferred embodiment also includes a brake or stop light 20 situated on the rear portion of the outer shell 11 which can be seen in FIG. 2. Upon the user's deceleration, an inertia-switch is activated which illuminates the word "STOP" on brake light 20. Therefore, the user can warn those behind the user that he or she has slowed down, and is preparing to stop.

The directional signals 17 and 18, the stop light 20, and all other features appear on the outer surface of the outer shell 11. This is critical since any protrusions on the inner surface of the outer shell 11 would cause an improper fit between the two shells and violate helmet safety standards.

FIGS. 1 and 2 clearly show an antenna 21 affixed to the outer surface of the outer shell 11. In an alternate embodiment, the antenna may be affixed internally, within the outer shell 11. The antenna is a collapsible or breakaway antenna capable of both transmitting and receiving audio signals in the form of electromagnetic waves. Preferably, antenna 21 does not extend more than 7 mm from the outer shell as per Consumer Product Safety Commission standards.

An electronics control module is embedded within the rear portion of the outer shell 11 and houses a transceiver and one or more removable and disposable batteries which power the circuitry of helmet 10. The transceiver provides the helmet with the capability to transmit as well as receive audio signals. The electronics module is completely removable and the batteries can be replaced by gaining access to a compartment housing the electronics module situated along the rear portion of the outer shell 11. Naturally, the rear portion of the outer shell 11 is larger that the front portion to accommodate the electronics module.

The transceiver, which has switching means to allow for switching between receiving and transmission modes, is electrically connected to both the antenna 21 and a communications module 22. The communications module 22 includes of a microphone 23 which receives sound from the user's mouth and transforms the sound into audio signals which are forwarded via an electrical connection to the transceiver. The transceiver then, after proper modulation of the audio signal, forwards the signal via electrical connections to antenna 21 which transmits the signals, in the form of electromagnetic waves, to a remote receiver. The communications module 22 includes an earphone assembly 24, situated proximate the user's ear. The transceiver receives signals from the antenna 21 and converts these signals to audible sound which is forwarded to earphone assembly 24. The signals received from the antenna 21 may be AM/FM signals or voice communications received from a remote transmitter. Channel selection control switches 25 and volume control switches 26 are situated on the side portion of the outer shell 11, thereby allowing the user to easily reach up and select a channel, or control the volume of sound emitted from earphone assembly 24.

An automatic squelch circuit is situated within the electronics module, and eliminates unwanted ambient noise. An audio override system is also situated within the electronics module. It contains circuitry which allows ambient sounds around the user and above a certain decibel level to override sound exiting the earphone assembly 24. This is particularly important if an ambulance, fire truck, or police car is in the vicinity.

A sound-emitting device comprised of a chip with pre-recorded voice messages can be included as a feature. The sound-emitting device is situated within the electronics module and is electrically connected to the earphone assembly 24 and is activated if the chin strap 19 is not fastened securely around the user's chin. The messages stored in the sound-emitting device may also be activated if the helmet 10 is not situated upon the user's head properly. Instead of a voice message, a loud siren-like noise may be pre-recorded and played. In either case, the user is reminded to wear the helmet properly and secure the helmet around his or her chin via the chin-straps thus insuring that the helmet is being used properly and safely. A horn can be removably affixed to the outer shell 11 of the helmet 10, within reach of the user to allow the user to warn others of their approach.

FIG. 1 shows a headlight assembly 27 in the front of the outer shell 11. The headlight assembly 27 is built right into the outer shell and provides illumination in the user's field of vision.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A two-piece safety helmet with directional and communication capabilities comprising:

a shock-absorbent inner shell adapted to fit comfortably upon a user's head;

an outer shell having front and rear portions, and opposing side portions defining a recess, wherein said recess is adapted to receive said inner shell and is affixed thereto via securing means;

a plurality of directional signals situated on the surface of said outer shell wherein said directional signals are activated via activation means;

a brake light which indicates when a helmet user is preparing to stop, wherein said brake light is situated on the surface of said outer shell and is illuminated via illumination means;

a removable electronics control module situated within said outer shell wherein said module houses a transceiver having transmission and receiving modes wherein said transceiver includes a switch designed to activate and deactivate said transmission and said receiver mode; and power means to supply power to said control module.

2. The safety helmet of claim 1 further comprising a communications module affixed to said outer shell wherein said communications module comprises an earphone assembly proximate to said user's ear.

3. The helmet of claim 2 further comprising an audio override system wherein ambient sounds above a predetermined decibel level override sound emanating from said earphone assembly.

4. The safety helmet of claim 1 wherein said directional signal activation means comprises a button within said user's reach and situated upon the outer surface of said outer shell to be manually depressed by said user thereby activating switching means.

5. The safety helmet of claim 4 where said switching means comprises a momentary contact switch.

6. The helmet of claim 1 further comprising a headlight assembly affixed to said front portion of said outer shell to provide illumination in the user's field of vision.

7. The helmet of claim 1 wherein said plurality of directional signals are situated on each side portion of said outer shell.

8. The helmet of claim 7 wherein said plurality of directional signals further include rear directional signals in the form of directional arrows situated on said rear portion of said outer shell substantially adjacent said brake light.

9. The helmet of claim 1 wherein said power means comprises one or more removable batteries.

10. A two-piece safety helmet with directional and communication capabilities comprising:

a shock-absorbent inner shell adapted to fit comfortably upon a user's head;

an outer shell comprised of a vacuum molded, single piece contiguous material, wherein said outer shell has front and rear portions, and opposing side portions defining a recess, wherein said recess is adapted to receive said inner shell and is affixed thereto via a hook and loop-type fastener strip or a snap situated along the periphery of both the inner surface of said outer shell and the outer surface of said inner shell;

a plurality of directional signals situated on each side portion of said outer shell wherein said directional signals are activated via the manual touching of a button within said user's reach and situated upon the outer surface of said outer shell thereby activating one or more momentary contact switches;

a brake light which indicates when a helmet user is preparing to stop, wherein said brake light is situated on the surface of said outer shell and is illuminated via illumination means comprising an inertia-switch which actuates said brake light upon the deceleration of said user;

a removable electronics control module situated within said outer shell wherein said module houses a transceiver having transmission and receiving modes wherein said transceiver includes a switch designed to activate and deactivate said transmission and said receiver mode;

one or more removable and disposable batteries to supply power to said control module;

a communications module affixed to a side portion of said outer shell wherein said communications module comprises an earphone assembly proximate said user's ear and a microphone module proximate said user's mouth;

selection means to select one of a plurality of channels in order to receive and transmit audio signals;

volume control means to increase or decrease the volume of said received audio signals;

an automatic squelch circuit to eliminate unwanted ambient noise when said transceiver is in said receiver mode;

an audio override system wherein ambient sounds above a predetermined decibel level override sound emanating from said earphone assembly;

means for cellular telephone communications;

means for pager communications;

an antenna affixed to the outer surface of said outer shell and having transmitting means to transmit a high frequency signal in the form of electromagnetic waves, and receiving means for receiving electromagnetic waves from a remote transmitter;

a helmet-securing chin strap;

a sound-emitting device situated within said electronics module wherein said sound-emitting device contains one or more pre-recorded voice messages or warning signals to alert said user if said chin strap is not fastened or is fastened incorrectly, or if said helmet is situated upon said helmet user's head in an unsafe manner;

a headlight assembly affixed to said front portion of said outer shell to provide illumination in said user's field of vision;

said plurality of directional signals include rear directional signals in the form of directional arrows situated on said rear portion of said outer shell substantially adjacent said brake light; and a horn removably affixed to said outer shell.

11. A safety helmet with directional and communication capabilities comprising:

a shock-absorbent shell adapted to fit comfortably upon a user's head, said shell having front and rear portions, and opposing side portions defining a recess;

a plurality of directional signals situated on the surface of said shell wherein said directional signals are activated via activation means;

a brake light which indicates when a helmet user is preparing to stop, wherein said brake light is situated on the surface of said shell and is illuminated via illumination means;

a removable electronics control module situated within said shell wherein said module houses a transceiver having transmission and receiving modes wherein said transceiver includes a switch designed to activate and deactivate said transmission and said receiver mode; and power means to supply power to said control module.

12. A safety helmet with directional and communication capabilities comprising:

a shock-absorbent shell adapted to fit comfortably upon a user's head, said shell comprised of a vacuum molded, single piece contiguous material, wherein said shell has front and rear portions, and opposing side portions defining a recess;

a plurality of directional signals situated on each side portion of said shell wherein said directional signals are activated via the manual touching of a button within said user's reach and situated upon the outer surface of said shell thereby activating one or more momentary contact switches;

a brake light which indicates when a helmet user is preparing to stop, wherein said brake light is situated on the surface of said shell and is illuminated via illumination means comprising an inertia-switch which actuates said brake light upon the deceleration of said user;

a removable electronics control module situated within said shell wherein said module houses a transceiver having transmission and receiving modes wherein said transceiver includes a switch designed to activate and deactivate said transmission and said receiver mode;

one or more removable batteries to supply power to said control module;

a communications module affixed to a side portion of said shell wherein said communications module comprises an earphone assembly proximate said user's ear and a microphone module proximate said user's mouth;

selection means to select one of a plurality of channels in order to receive and transmit audio signals;

volume control means to increase or decrease the volume of said received audio signals;

an automatic squelch circuit to eliminate unwanted ambient noise when said transceiver is in said receiver mode;

an audio override system wherein ambient sounds above a predetermined decibel level override sound emanating from said earphone assembly;

means for cellular telephone communications;

means for pager communications;

an antenna affixed to the outer surface of said shell and having transmitting means to transmit a high frequency signal in the form of electromagnetic waves, and receiving means for receiving electromagnetic waves from a remote transmitter;

a helmet-securing chin strap;

a sound-emitting device situated within said electronics module wherein said sound-emitting device contains one or more pre-recorded voice messages or warning signals to alert said user if said chin strap is not fastened or is fastened incorrectly, or if said helmet is situated upon said helmet user's head in an unsafe manner;

a headlight assembly affixed to said front portion of said shell to provide illumination in said user's field of vision;

said plurality of directional signals include rear directional signals in the form of directional arrows situated on said rear portion of said shell substantially adjacent said brake light; and a horn removably affixed to said shell.

13. A two-piece safety helmet with directional and communication capabilities comprising:

a shock-absorbent inner shell adapted to fit comfortably upon a user's head;

an outer shell having front and rear portions, and opposing side portions defining at least one recess, wherein said recess is adapted to receive said inner shell and is affixed thereto via securing means;

a chin strap affixed to said helmet;

at least one directional signal situated on the surface of said outer shell which is activated via a means for activating;

a brake light which indicates when a helmet user is preparing to stop, wherein said brake light is situated on the surface of said outer shell and is illuminated via a means for illuminating;

a removable electronics control module situated within said outer shell wherein said module houses a transceiver having transmission and receiving modes wherein said transceiver includes a switch designed to activate and deactivate said transmission and said receiver mode;

said electronics control module further having a sound-emitting device, said sound-emitting device capable of emitting one or more warning signals to alert said user if said chin strap is not fastened or is fastened incorrectly, or if said helmet is situated upon said helmet user's head in an unsafe manner; and, means for supplying power to said control module.

14. A two-piece safety helmet with directional and communication capabilities comprising:

a shock-absorbent inner shell adapted to fit comfortably upon a user's head;

an outer shell having front and rear portions, and opposing side portions defining at least one a recess, wherein said recess is adapted to receive said inner shell and is affixed thereto via securing means;

a removable electronics control module situated within said outer shell wherein said module houses a radio-frequency receiver;

a speaker assembly electrically connected to said electronics control module, said speaker assembly being positioned proximate to said user's ear when the user is wearing the helmet;

means for overriding said speaker when ambient sounds exceed a predetermined decibel level; and, means for supplying power to said control module.

15. A two-piece safety helmet with directional and communication capabilities comprising:

a shock-absorbent inner shell adapted to fit comfortably upon a user's head;

an outer shell having front and rear portions, and opposing side portions defining at least one a recess, wherein said recess is adapted to receive said inner shell and is affixed thereto via securing means;

a chin strap affixed to said helmet;

said electronics control module further having a sound-emitting device, said sound-emitting device capable of emitting one or more warning signals to alert said user if said chin strap is not fastened or is fastened incorrectly, or if said helmet is situated upon said helmet user's head in an unsafe manner; and, means for supplying power to said control module.

* * * * *